US010305735B2

(12) United States Patent
Seetharaman et al.

(10) Patent No.: US 10,305,735 B2
(45) Date of Patent: May 28, 2019

(54) SYSTEM AND METHOD FOR DYNAMIC SELECTION OF MEDIA SERVER IN A COMMUNICATION NETWORK (71) Applicant: Wipro Limited, Bangalore (IN)

(72) Inventors: Swaminathan Seetharaman, Chennai (IN); Ramesh Madhavan, Chennai (IN)

(73) Assignee: Wipro Limited, Bangalore (IN)

( * ) Notice: Subject to any disclaimer, the term of this patent is extended or adjusted under 35 U.S.C. 154(b) by 166 days.

(21) Appl. No.: 14/931,501

(22) Filed: Nov. 3, 2015

(65) Prior Publication Data

US 2017/0070385 A1  Mar. 9, 2017

(30) Foreign Application Priority Data

Sep. 8, 2015  (IN) ............................ 4763/CHE/2015

(51) Int. Cl.
*G06F 15/173* (2006.01)
*H04L 12/24* (2006.01)
*H04L 29/06* (2006.01)
*H04L 29/08* (2006.01)

(52) U.S. Cl.
CPC ........ *H04L 41/083* (2013.01); *H04L 41/0816* (2013.01); *H04L 65/1016* (2013.01); *H04L 65/1023* (2013.01); *H04L 65/1083* (2013.01); *H04L 67/101* (2013.01); *H04L 67/1021* (2013.01); *H04L 67/327* (2013.01)

(58) Field of Classification Search
CPC ......... H04L 29/06; H04L 29/08; H04L 65/80; H04L 65/1083; H04L 41/0816; H04L 41/083; H04L 65/1016; H04L 65/1023
See application file for complete search history.

(56) References Cited

U.S. PATENT DOCUMENTS 7,346,056 B2 * 3/2008 Devi ....................... H04L 45/00
370/392
7,707,296 B2   4/2010 de Oliveira
7,929,429 B2 * 4/2011 Bornstein ............... H04L 29/06
370/227

(Continued)

FOREIGN PATENT DOCUMENTS

EP           2053869 A1    4/2009
EP           2139154 A1 * 12/2009 ......... H04L 65/1066
WO    WO 2014121685 A1 *  8/2014 ....... H04N 21/23439

*Primary Examiner* — Benjamin M Thieu
(74) *Attorney, Agent, or Firm* — Pepper Hamilton LLP (57) ABSTRACT A system and method for dynamic selection of media server in a communication network includes selecting a new media server to optimize a communication network. At least one of a user characteristic, a session characteristic, or a network condition is monitored during an ongoing communication session involving an existing media server. A need for selection of a new media server is determined based on at least one of the user characteristic, the session characteristic, or the network condition. The new media server to optimize the communication network is dynamically selected in response to the need. The dynamic selection may determine a plurality of overall network path lengths between each of a plurality of selectable media servers and a plurality of user equipment involved in the ongoing communication session.

20 Claims, 5 Drawing Sheets (56) References Cited

U.S. PATENT DOCUMENTS

| | | | | |
|---|---|---|---|---|
| 8,396,983 | B1* | 3/2013 | Inskip | H04L 29/06517 |
| | | | | 709/203 |
| 8,751,638 | B2* | 6/2014 | Ravindran | H04L 45/50 |
| | | | | 370/352 |
| 9,043,453 | B1* | 5/2015 | Kielhofner | H04L 29/08072 |
| | | | | 709/223 |
| 9,667,542 | B2* | 5/2017 | Sella | H04L 41/12 |
| 2004/0025186 | A1* | 2/2004 | Jennings | H04L 29/06 |
| | | | | 725/93 |
| 2005/0048973 | A1* | 3/2005 | Hou | H04L 29/06027 |
| | | | | 455/436 |
| 2005/0083844 | A1* | 4/2005 | Zhu | H04L 29/06027 |
| | | | | 370/230.1 |
| 2006/0039397 | A1* | 2/2006 | Hari | H04L 29/06027 |
| | | | | 370/431 |
| 2007/0058609 | A1* | 3/2007 | Goel | H04L 29/06027 |
| | | | | 370/352 |
| 2008/0063173 | A1* | 3/2008 | Sarkar | H04L 12/1827 |
| | | | | 379/202.01 |
| 2011/0243149 | A1* | 10/2011 | Xie | H04L 65/1016 |
| | | | | 370/410 |
| 2012/0060052 | A1* | 3/2012 | White | G06F 11/2025 |
| | | | | 714/6.3 |
| 2012/0275372 | A1* | 11/2012 | Bertz | H04W 36/0055 |
| | | | | 370/312 |
| 2015/0046558 | A1* | 2/2015 | Padgett | H04L 45/121 |
| | | | | 709/217 |

* cited by examiner

SYSTEM AND METHOD FOR DYNAMIC SELECTION OF MEDIA SERVER IN A COMMUNICATION NETWORK

This application claims the benefit of Indian Patent Application Serial No. 4763/CHE-2015 filed Sep. 8, 2015, which is hereby incorporated by reference in its entirety.

FIELD

This disclosure relates generally to communication networks, and more particularly to a system and method for dynamic selection of media server in a communication network.

BACKGROUND

In today's world, mobile devices are increasingly used to perform functions such as streaming multimedia content, playing high definition online games, enabling video calls, and so forth in addition to basic voice calls. These functions have become an integral part of our daily lives, but each of these and other functions enabled by mobile devices requires network resources. It is therefore important to efficiently and effective manage such communication sessions by optimizing network resources.

For calls involving users across different (access as well as core) networks and involving VoIP network, next generation network (NGN), or IP multimedia subsystem (IMS) network, optimization of network resources for media plane transport may be achieved by optimizing the overall network path between the calling user and called user involved in the communication session while ensuring no adverse impact to the session itself. Optimizing the overall network path is typically achieved by eliminating unnecessary nodes in the network path of the media flow, and by optimizing the transmission length over which the media content is transported between the calling and called users. A technique for optimizing the overall network path is the selection of the appropriate media server for sessions involving media server resources, e.g., conferencing, transcoding, and so forth. For example, in a conference call involving a roaming User A (in visited Network 2) whose home network is Network 1, and 2 users (User B and User C) in their home network (Network 3), selection of a media server in either Network 2 or in Network 3 based on certain pre-defined criteria would eliminate the need for the media transport to pass via Network 1, hence optimizing the overall network path.

Various techniques have been proposed for selection of appropriate media server for sessions involving media server resources. For example, a technique for selection of appropriate media server is proposed at the point when a media server is required to be brought into the session for the first time for a particular feature (e.g., conference) and may include scenarios involving roaming of the served user. Similarly, another technique for selection of optimal media server for conference calls, takes into account the CPU load (utilization level) of the media processors (the media plane of a media server) that are controlled by a multipoint controller unit (the control plane of a media server) in an operator's network. Further, yet another technique for selection of optimal media server takes into account the calling user's location (which is determined by the prefix or the trunk-group identity, in case of a landline number) and in case of unavailability of calling user's location, the technique takes into account the called user's location.

However, the existing techniques for selection of media server are inappropriate for network optimization. First, existing techniques use static selection based on factors like called/calling user's location alone at the start of a session or at the start of usage of media server resources for the session. However, in a practical scenario (e.g., multi-party conference), in order to optimize the network resource usage due to user mobility, dynamic network conditions or changes in the session characteristics, the techniques fail to provide mechanism for appropriate selection of media server while keeping the network resources optimized. Secondly, even for the static selection techniques there are certain issues such as, when a new user joins or leaves a multi-party conference scenario, the selection may not remain appropriate as only the calling and/or called users location are taken into consideration. The issue may get further complicated by activation of lawful interception (LI) for one or more conference users. Third, Only CPU utilization is considered during the media server selection. As a consequence, if congestion-levels in the network segment in which the media server is present or if other system resources of the media server apart from the CPU utilization are affected, it could lead to poor quality of the session or abrupt session termination from a user perspective, and also a further degradation/failure of network resources. Accordingly, the existing techniques fail to provide appropriate selection of the media server in such real-world scenarios.

SUMMARY

In one embodiment, a method for selecting a new media server to optimize a communication network is disclosed. In one example, the method comprises monitoring at least one of a user characteristic, a session characteristic, or a network condition during an ongoing communication session involving an existing media server. The method further comprises determining a need for selection of a new media server based on the at least one of the user characteristic, the session characteristic, or the network condition. The method further comprises dynamically selecting the new media server to optimize the communication network in response to the need, wherein dynamically selecting comprises determining a plurality of overall network path lengths between each of a plurality of selectable media servers and a plurality of user equipment involved in the ongoing communication session.

In one embodiment, communication management network computing device is configured to select a new media server to optimize a communication network is disclosed. In one example, the communication management network computing device comprises at least one processor and a memory communicatively coupled to the at least one processor. The memory stores processor-executable instructions, which, on execution, cause the processor to monitor at least one of a user characteristic, a session characteristic, or a network condition during an ongoing communication session involving an existing media server. The processor-executable instructions, on execution, further cause the processor to determine a need for selection of a new media server based on at least one of the user characteristic, the session characteristic, or the network condition. The processor-executable instructions, on execution, further cause the processor to dynamically select the new media server to optimize the communication network in response to the need, wherein dynamically selecting comprises determining a plurality of overall network path lengths between each of a plurality of selectable media servers and a plurality of user equipment involved in the ongoing communication session.

In one embodiment, a non-transitory computer-readable medium storing computer-executable instructions for selecting a new media server to optimize a communication network is disclosed. In one example, the stored instructions, when executed by a processor, cause the processor to perform operations comprising monitoring at least one of a user characteristic, a session characteristic, and a network condition during an ongoing communication session involving an existing media server. The operations further comprise determining a need for selection of a new media server based on at least one of the user characteristic, the session characteristic, or the network condition. The operations further comprise dynamically selecting the new media server to optimize the communication network in response to the need, wherein dynamically selecting comprises determining a plurality of overall network path lengths between each of a plurality of selectable media servers and a plurality of user equipment involved in the ongoing communication session.

It is to be understood that both the foregoing general description and the following detailed description are exemplary and explanatory only and are not restrictive of the invention, as claimed.

BRIEF DESCRIPTION OF THE DRAWINGS

The accompanying drawings, which are incorporated in and constitute a part of this disclosure, illustrate exemplary embodiments and, together with the description, serve to explain the disclosed principles.

DETAILED DESCRIPTION

Exemplary embodiments are described with reference to the accompanying drawings. Wherever convenient, the same reference numbers are used throughout the drawings to refer to the same or like parts. While examples and features of disclosed principles are described herein, modifications, adaptations, and other implementations are possible without departing from the spirit and scope of the disclosed embodiments. It is intended that the following detailed description be considered as exemplary only, with the true scope and spirit being indicated by the following claims.

Figure 1:
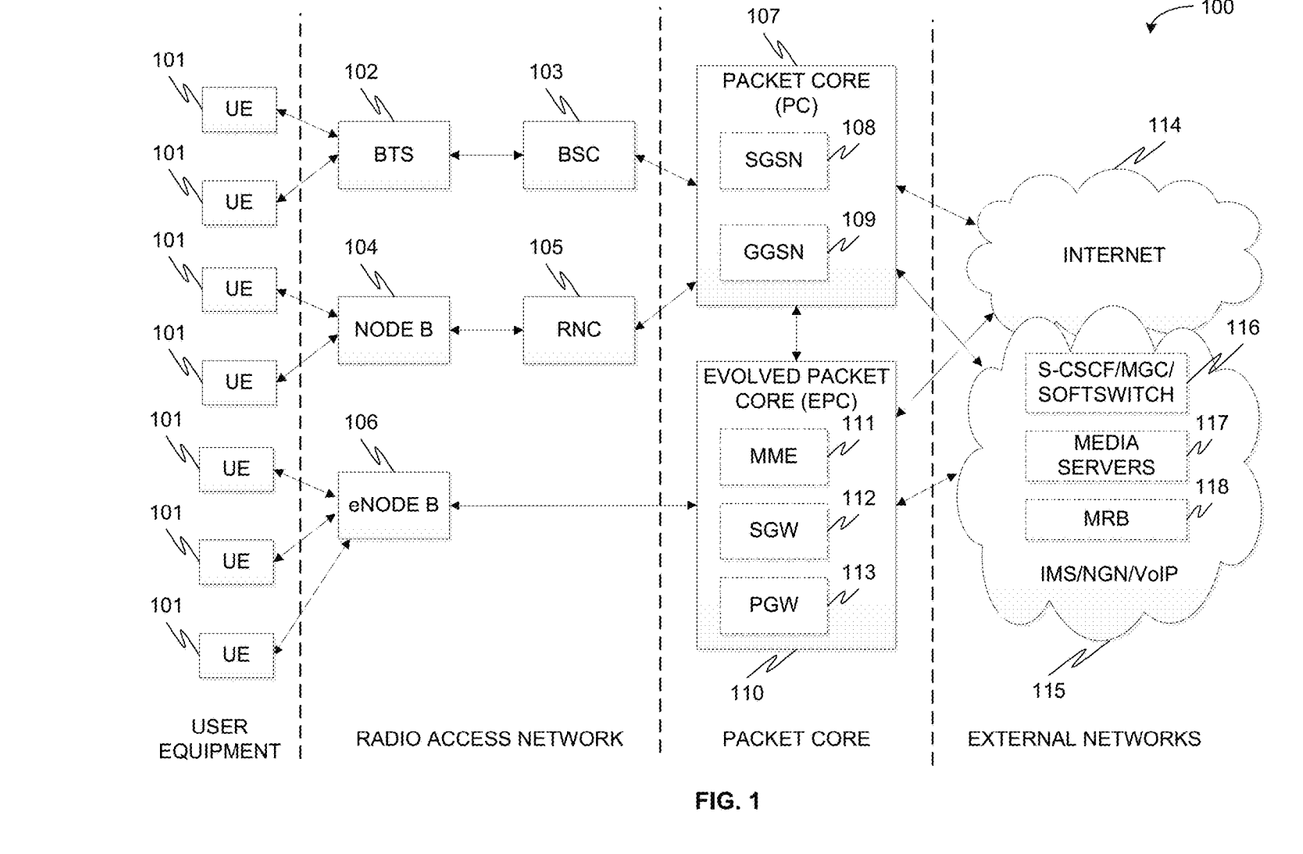
FIG. 1 illustrates an exemplary communication network architecture in which various embodiments of the present disclosure may function.

Referring now to FIG. 1, an exemplary communication network architecture in which various embodiments of the present disclosure may function is illustrated. The communication network 100 may include one or more user equipment (UE) 101 communicating wirelessly with various radio access networks. Examples of a UE 101 may include but are not limited to a cell phone, a smart phone, a tablet, a phablet, and a laptop. For purpose of illustration, the various radio access networks include but are not limited to a GSM EDGE radio access network (GERAN), a UMTS terrestrial radio access network (UTRAN), and an evolved UMTS terrestrial radio access network (E-UTRAN). A base transceiver station (BTS) 102 and a base station controller (BSC) 103 form the GERAN while a Node B 104 and a radio network controller (RNC) 105 form the UTRAN. Similarly, evolved Node B (eNode B) 106 form the E-UTRAN and acts as the base station for E-UTRAN i.e., LTE network. However, the depicted radio access networks are merely exemplary, and thus it will be understood that the teachings of the disclosure contemplate other wired and wireless radio access networks such as worldwide interoperability for microwave access (WiMAX) network, code division multiple access (CDMA) network, High Speed Packet Access (3GPP's HSPA) network, and so forth.

Each of the radio access networks may communication with a respective packet core which in turn may communicate with external packet switched networks. For example, in the illustrated embodiment, the GERAN and the UTRAN communicate with a packet core 107 that comprises serving GPRS support node (SGSN) 108 and gateway GPRS support node (GGSN) 109. As will be appreciated by those skilled in the art, general packet radio service (GPRS) is a packet-oriented mobile data service that enables 2G and 3G cellular networks to transmit IP packets to external networks such as the Internet. The SGSN 108 is a component of the GPRS network that handles functions related to packet switched data within the network such as packet routing and transfer, mobility management, charging data, authentication of the users, and so forth. Similarly, GGSN 109 is another component of the GPRS network and is responsible for the interworking between the GPRS network and external packet switched networks, such as Internet 114. Similarly, E-UTRAN communicates with an evolved packet core (EPC) 110 that comprises a mobility management entity (MME) 111, a serving gateway (SGW) 112, and a packet data network gateway (PGW) 113. The MME 111 may be responsible for evolved packet system (EPS) session management (ESM), EPS mobility management (EMM), EPS connection management (ECM), ciphering and integrity Protection, inter core network signaling, system architecture evolution (SAE) bearer control, handover, and so forth. The combined functionalities of the SGW 112 and the PGW 113 may include lawful interception (LI), packet routing and forwarding, transport level packet marking in the uplink and the downlink, packet filtering, mobile IP, policy enforcement, and so forth. The PGW 113 further connects the EPC 110 with external packet switched networks such as the Internet 114.

The external networks may include the Internet 114 and any other packet switched networks 115. Examples of the packet switched networks may include but are not limited to a Voice over IP (VoIP) network, a next generation network (NGN), an IP multimedia subsystem (IMS) network, and so forth. Each of the packet switched networks 115 may include a node 116 that anchors the session and is responsible for session management, routing and control. The node 116 may be a media gateway controller (MGC) in case of the NGN, a softswitch in case of the VoIP network, or a serving—call session control function (S-CSCF) in case of the IMS networks. Additionally, the node 116 may be responsible for control and management of media servers 117. For example, the node 116 may be responsible for dynamic selection of media servers 117 in accordance with aspects of the present disclosure. In some embodiments, the node 116 may invoke the services of a media resource broker (MRB) 118 for selecting the appropriate media server 117. In particular, the node 116 comprises one or more processors and a computer-readable medium (e.g., a memory) so as to implement various modules and/or subsystems for dynamic and optimal selection of media servers in the communication network 100. The computer-readable medium stores instructions that, when executed by the one or more processors, cause the one or more processors to perform dynamic selection of media servers in accordance with aspects of the present disclosure. The media server 117 processes the audio or video streams associated with a communication session. It will be further apparent to a person skilled in the art that for a communication network other than those illustrated, network components and parameters associated with that communication network will be used.

Figure 2:
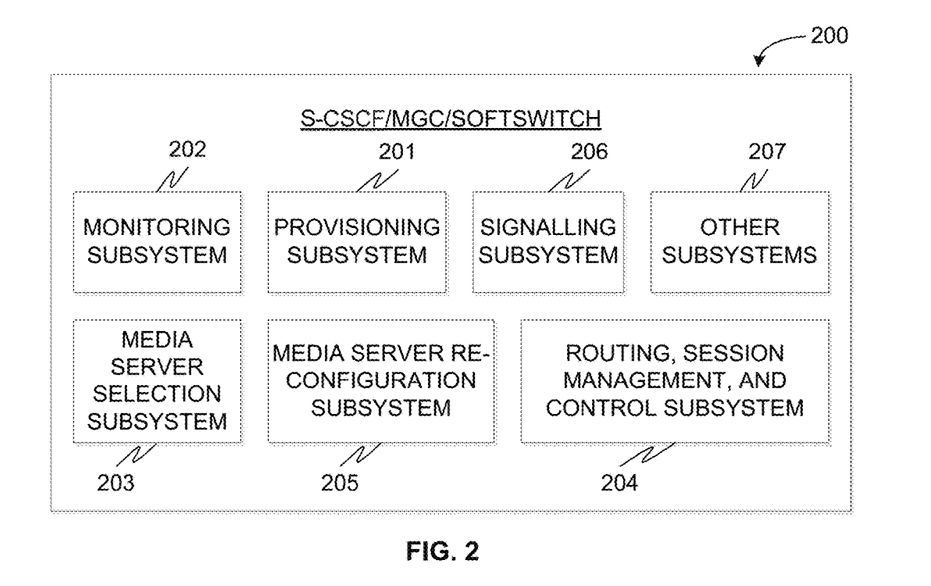
FIG. 2 is a functional block diagram of an exemplary component (S-CSCF/MGC/softswitch) in the network architecture that performs dynamic selection of media servers in accordance with some embodiments of the present disclosure.

Referring now to FIG. 2, a functional block diagram of the node 200 analogous to the node 116 implemented by the communication network 100 of FIG. 1 is illustrated in accordance with some embodiments of the present disclosure. As stated above, the node 200 may be the MGC, the softswitch, or the S-CSCF. As will be described in greater detail below, the node 200 monitors users, session characteristics, and/or network conditions and determines a need for dynamically selecting a media server during a communication session. The node 200 may further select the media server in response to the determined need. In some embodiments, the node 200 comprises a provisioning subsystem (PSS) 201, a monitoring subsystem (MOSS) 202, a media server selection subsystem (MSSS) 203, a routing, session management, and control subsystem (RSMCS) 204, a media server reconfiguration subsystem (MSRS) 205, a signalling subsystem (SIGSS) 206, and other subsystems 207.

The PSS 201 is typically responsible for obtaining the provisioned inputs from the operator and passing them to the relevant subsystems of the softswitch/MGC/S-CSCF 200. Such provisioned inputs may include inputs for session management and control, the list of interfacing signaling nodes (e.g., another softswitch/MGC in case of VoIP or NGN, or interrogating-CSCF (I-CSCF), proxy-CSCF (P-CSCF), breakout gateway control function (BGCF), home subscriber server (HSS), etc. in case of IMS), and so forth. In addition to its existing functions, the PSS 201 obtains provisioned inputs of the network topology, including the location of the various media servers in the network. The PSS 201 passes this input to the MSSS 203. The PSS 201 further obtains provisioned inputs of the policies related to session routing and media server selection (e.g., a call involving a LI target user must be routed via the home network of the LI target user, and a media server present in the LI target's home network must be selected). The PSS 201 passes this input to the RSMCS 204 and to the MSSS 203. The PSS 201 further obtains provisioned inputs about inter-operator agreements regarding usage of media server resources, in case of calls involving roaming, and in case of users involved in the session being present in different networks. The PSS 201 passes this input to the MSSS 203. The PSS 201 further obtains provisioned inputs about the thresholds for factors that must trigger a (re)selection of the media server (for e.g., load level of system resources of the media server, congestion level in the network segment of the media server, change in overall network path length), and threshold limits based on which a media server re-selection should not be performed (for e.g., the last media server (re)selection took place <'x' minutes ago, <'y' minutes are remaining for a scheduled conference call). The PSS 201 passes this input to the MOSS 202 and to the MSSS 203.

The MOSS 202 performs functions related to measurements and monitoring of various resources and network conditions. Additionally, the MOSS 202 informs the media servers, via the SIGSS 206, of the system resources load and network congestion threshold limits upon crossing which the media servers should notify the MOSS regularly. It further receives notification from the media servers, via the SIGSS 206, regularly once the thresholds are crossed, until the situation returns to normal (i.e., the values become lower than the thresholds). It then passes the relevant information to the MSSS 203 upon receiving such notifications from the media servers. Further, the MOSS 202 collects information from relevant sub-systems about the congestion level in the overall network and current call attempts per second (CAPS) being handled by the RSMCS 204. Based on factors such as overall network congestion, current CAPS handled by the RSMCS 204, load levels of all media servers, and so forth, the MOSS 202 dynamically adjusts relevant thresholds of network conditions that must trigger a (re)selection of the media server (e.g., threshold for the load level of the media server, congestion level in the network segment of the media server). After adjusting the thresholds, the MOSS 202 determines whether the MSSS 203 should be triggered for media server selection. It should be noted that the threshold adjustment and determination may be performed upon receiving a notification from one or more media servers, or may be performed periodically.

The MSSS 203 performs functions related to media server selection. In accordance with aspects of the present disclosure, the MSSS 203 determines whether a media server has to be selected for one or more ongoing user sessions, based on factors such as mobility of one or more users involved in the session, change in session characteristics (e.g., a new codec introduced), congestion-levels in the network segment in which the media server is present or if system resources of the media server (CPU utilization as well as other resources) are affected, congestion level in the overall network, when did the last media server selection happen for the session, time remaining for the session in case of a scheduled conference, and so forth. If a new media server has to be selected, the MSSS 203 executes an algorithm, such as what is described in greater detail below in FIG. 6, to determine the appropriate media server. The MSSS 203 then instructs the media server reconfiguration subsystem MSRS 205 to perform the necessary actions to ensure a seamless handover of the session from one media server to another.

The RSMCS 204 performs routing, session management and control functions. Such functions may include setting up and tear down of the session, routing a session initiation request after suitable processing to the correct node (e.g., to a BGCF for a call from an IMS calling user towards a public land mobile network (PLMN) or public switched telephone network (PSTN) called user), performing appropriate actions upon invocation of features (e.g., call forwarding, call completion to busy subscriber), passing relevant information to the billing sub-system, and so forth. While performing its functions, the RSMCS 204 may send or receive messages to or from other nodes via the SIGSS 206. In addition to its existing functions, the RSMCS 204 provides regular updates to the MOSS 202 on the current CAPS being handled. It also provides relevant inputs regarding the availability of different media servers to the MSSS 203 based on various parameters such as heartbeat/heartbeat response received from the media servers. The RSMCS 204 further receives instruction from the MSRS 205 to re-configure the session, and perform the necessary actions.

The MSRS 205 is responsible for ensuring a seamless handover of the media server after a media server re-selection happens. Upon trigger from the MSSS 203 to perform a media server handover, the MSRS 205 requests and receives relevant information from the RSMCS 204 and the MOSS 202, and determines the steps involved in the handover process, taking into consideration factors such as session characteristics (e.g., voice session, data session), locations and distance between the presently used media server and newly selected media server, and so forth. The MSRS 205 then instructs the RSMCS 204 to appropriately reconfigure the session, and also sends relevant instructions, via the SIGSS 206, to the presently used media server and newly selected media server. Upon completion of the reconfiguration actions, the MSRS 205 informs the MSSS 203.

The SIGSS 206 is primarily responsible for sending/receiving signaling messages to/from other nodes in the network, thereby acting as the signaling interface. Such nodes may include HSS, I-CSCF, P-CSCF, BGCF, media servers, application servers, etc. in case of an IMS network, or another softswitch/MGC, media gateway (MGW), application servers, etc. in case of a VoIP/NGN network. In addition to its existing functions, the SIGSS 206 receives the threshold values of congestion level and utilization of system resources of the media server (CPU as well as other resources) from the MOSS 202, and conveys the received information to the different media servers. Upon receiving a notification from a media server containing info about crossing of threshold values, the SIGSS 206 passes the information to the MOSS 202. Additionally, upon receiving instruction about the media server handover actions, the SIGSS 206 passes relevant instructions to the present and the newly selected media server. As will be appreciated by those skilled in the art, the other sub-systems 207 may be responsible for functions such as billing, configuration, maintenance, and so forth.

Figure 3:
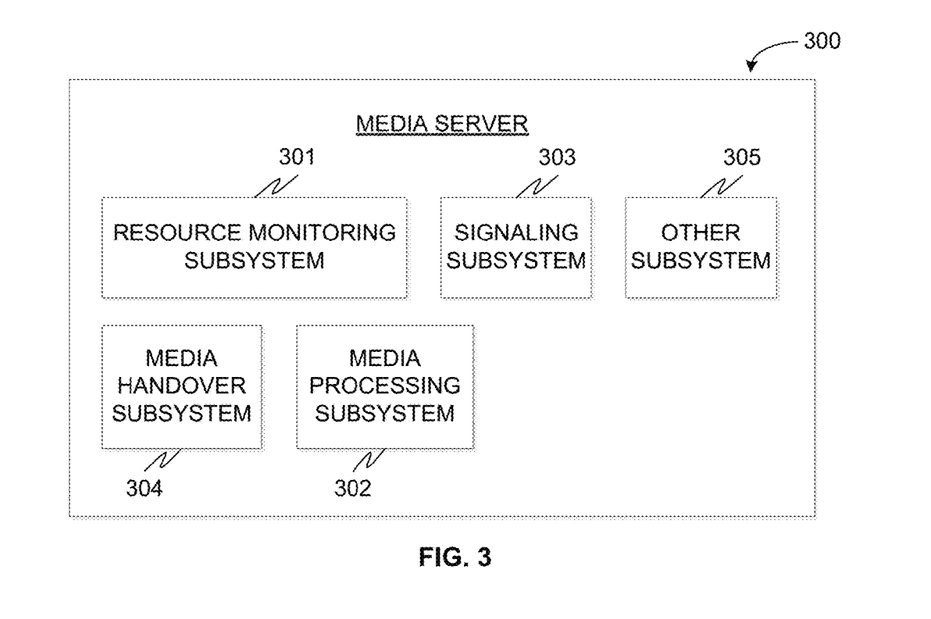
FIG. 3 is a functional block diagram of an exemplary media server in accordance with some embodiments of the present disclosure.

Referring now to FIG. 3, a functional block diagram of the media server 300 analogous to the media server 117 implemented by the communication network 100 of FIG. 1 is illustrated in accordance with some embodiments of the present disclosure. As stated above, the media server 300 processes the audio or video streams associated with the communication session. In some embodiments, the media server 300 comprises a resource monitoring subsystem (RMS) 301, a media processing subsystem (MPS) 302, a signalling subsystem (SIS) 303, a media handover subsystem (MHSS) 304, and other subsystems 305.

The RMS 301 performs functions such as monitoring of the resources in the media server, helping to decide whether media processing can be done for a session as requested by the softswitch/MGC/S-CSCF, and so forth. In addition to its existing functions, the RMS 301 receives pre-defined thresholds from the softswitch/MGC/S-CSCF, via the SIS 303, for utilization of system resources (e.g., CPU as well as other resources) in the media server, and the network congestion level in the network segment in which the media server is present. The RMS 301 further monitors the utilization of system resources in the media server, and the network congestion level in the network segment in which the media server is present. Upon crossing the pre-defined thresholds the RMS 301 sends regular notifications to the softswitch/MGC/S-CSCF, via the SIS 303, until the situation comes back to normal (i.e., the values go below the thresholds). The MPS 302 is responsible for media processing functions such as transcoding, creating multiple copies of media contents, distributing media contents to all the users involved in a session, performing media content duplication for lawful interception (LI), and so forth. In addition to its existing functions, the MPS 302 delays sending of certain media packets to the users involved in the session, and/or forward last few media packets to the newly selected media server based on instructions received from the MHSS 304.

The SIS 303 is the signaling interface to other nodes in the network (e.g., to the softswitch/MGC/S-CSCF, and to the MRB if an MRB is present). In addition to its existing functions, the SIS 303 receives pre-defined thresholds from the softswitch/MGC/S-CSCF for utilization of system resources in the media server, and the network congestion level in the network segment in which the media server is present. The SIS 303 passes this information to the RMS 301. Further, the SIS 303 receives notification from the RMS 301 upon crossing of pre-defined thresholds, and pass this notification to the softswitch/MGC/S-CSCF. Further, the SIS 303 receives instructions from the softswitch/MGC/S-CSCF regarding actions to be performed during the handover of the media server to a new media server, and pass the instructions to the MHSS 304.

The MHSS 304 is responsible for seamless handover from an existing media server (EMS) to a newly selected media server (NSMS) after a media server re-selection occurs. The MHSS 304 in the EMS receives instructions from the softswitch/MGC/S-CSCF for the actions to be performed during the media server handover to the NSMS. For example, MHSS 304 ensures all available media packets are successfully sent and acknowledged, drops any pending media packets, and so forth. The MHSS 304 translates these instructions into actions and instructs the MPS 302 accordingly. The MHSS 304 in the EMS further sends a notification to the softswitch/MGC/S-CSCF upon successful completion of requested actions. Similarly, the MHSS 304 in the NSMS receives instructions from the softswitch/MGC/S-CSCF for the actions to be performed during the media server handover from the EMS. For example, MHSS 304 delays sending of new packets to the users involved in the session, ensures all earlier packets received from the existing media server are sent to the users and acknowledged successfully, and so forth. The MHSS 304 translates these instructions into actions and instructs the MPS 302 accordingly. The MHSS 304 in the NSMS further sends a notification to the softswitch/MGC/S-CSCF upon successful completion of requested actions. As will be appreciated by those skilled in the art, the other sub-systems 305 may be responsible for functions such as provisioning, collection of DTMF digits, heartbeat with the softswitch/MGC/S-CSCF, and so forth.

It should be noted that the node 200 or the media server 300 may be implemented in programmable hardware devices such as programmable gate arrays, programmable array logic, programmable logic devices, and so forth. Alternatively, the node 200 or the media server 300 may be implemented in software for execution by various types of processors. An identified engine of executable code may, for instance, comprise one or more physical or logical blocks of computer instructions which may, for instance, be organized as an object, procedure, function, module, or other construct. Nevertheless, the executables of an identified engine need not be physically located together, but may comprise disparate instructions stored in different locations which, when joined logically together, comprise the engine and achieve the stated purpose of the engine. Indeed, an engine of executable code could be a single instruction, or many instructions, and may even be distributed over several different code segments, among different applications, and across several memory devices.

As will be appreciated by one skilled in the art, a variety of processes may be employed for dynamic and optimized selection of media server in the communication network for multi-party communication scenario under dynamic network and user session characteristics. For example, the exemplary communication network 100, the associated node 200, and the associated media servers 300 may facilitate dynamic and optimal (re)selection of media server during a communication session by the processes discussed herein. In particular, as will be appreciated by those of ordinary skill in the art, control logic and/or automated routines for performing the techniques and steps described herein may be implemented by components of the communication network 100 (e.g., the IMS 114 via the associated node 200, and the media servers 300), either by hardware, software, or combinations of hardware and software. For example, suitable code may be accessed and executed by the one or more processors on the node 200 and the media servers 300 to perform some or all of the techniques described herein. Similarly, application specific integrated circuits (ASICs) configured to perform some or all of the processes described herein may be included in the one or more processors on the node 200 and the media servers 300.

Figure 4:
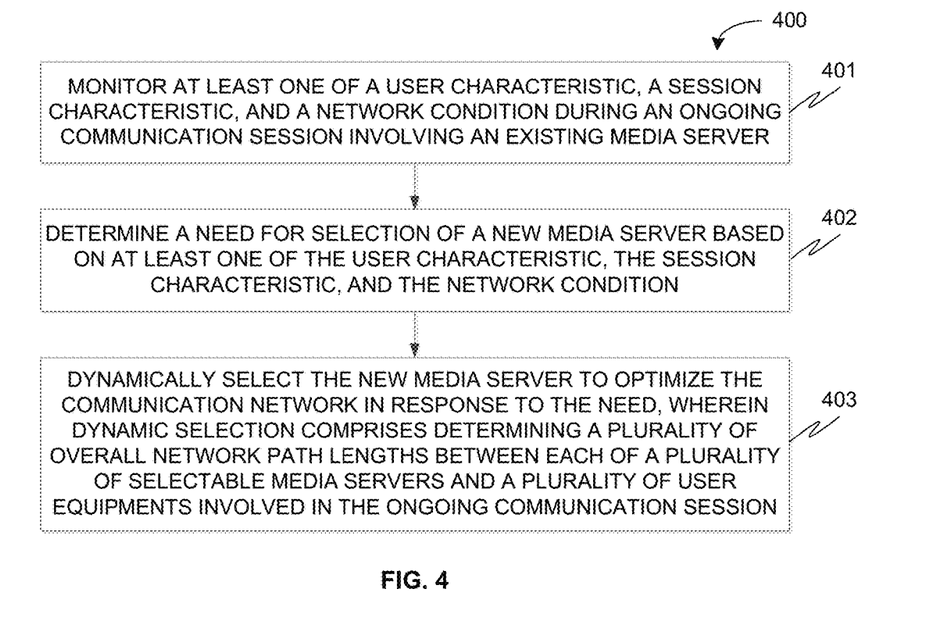
FIG. 4 is a flow diagram of an exemplary process for dynamic selection of media severs in accordance with some embodiments of the present disclosure.

For example, referring now to FIG. 4, exemplary control logic 400 for selecting a new media server to optimize a communication network 100 via a system, such as the node 200 and the media server 300, is depicted via a flowchart in accordance with some embodiments of the present disclosure. As illustrated in the flowchart, the control logic 400 includes the steps of monitoring at least one of a user characteristic, a session characteristic, and a network condition during an ongoing communication session involving an existing media server at step 401, determining a need for selection of a new media server based on at least one of the user characteristic, the session characteristic, or the network condition at step 402, and dynamically selecting the new media server to optimize the communication network in response to the need at step 403. In some embodiments, dynamically selecting at step 403 comprises determining a plurality of overall network path lengths between each of a plurality of selectable media servers and a plurality of user equipment involved in the ongoing communication session. It should be noted that, the user characteristic comprises at least one of an identification of a user participating in the ongoing communication session, a policy with respect to the user (e.g. activation of LI for the user), a location of the user, a mobility of the user, a speed of movement of the user, or a past behavior of the user (e.g., whenever the user calls a particular group of people, he switches from initially placed voice call to video call during the call or shares desktop or music during the call). Additionally, it should be noted that the session characteristic comprises a type of or a class of the session (e.g., voice call, video call, data session, conference call, and so forth), a codec employed in the session, a policy with respect to the session, a duration elapsed since a previous selection of a media server for the session, a minimum remaining duration of the session, an addition of a new user to the session, an exit of a user from the session, and a number of users participating in the session. As will be appreciated by those skilled in the art, a network topology or a location of each of a plurality of media servers in the network may be altered based on at least one of the user characteristics (e.g., user mobility) and the session characteristics (e.g., user joining or leaving the session). Further, it should be noted that the network condition comprises at least one of a load on each of the plurality of media servers, a policy with respect to selection of the media server, or a congestion in the network segment in which each of the plurality of media servers is located.

In some embodiments, the control logic 400 may further include the step of provisioning a network topology, a plurality of policies related to the ongoing communication sessions and to the selection of the media server, and a threshold value for the network condition triggering the selection of the media server. Additionally, in some embodiments, the control logic 400 includes the step of configuring one or more components of the communication network based on the provisioning. In some embodiments, determining at step 402 further comprises comparing the at least one of the user characteristic, the session characteristic, or the network condition against a corresponding pre-configured criteria or thresholds. Additionally, in some embodiments, dynamically selecting at step 403 further comprises adjusting each of the plurality of overall network path lengths based on at least one of a resource usage level of the corresponding media server or a network segment congestion level in which the corresponding media server is located, and selecting an optimal media server from the plurality of selectable media servers based on adjusted overall network path lengths for the plurality of selectable media servers. In some embodiments, the control logic 400 may further include the step of identifying the plurality of selectable media servers based on at least one of a plurality of policies related to each of the one or more ongoing communication sessions and to the selection of each of a plurality of media servers, the resource usage level of each of the plurality of media servers, or the network segment congestion level in which the media server is located for each of the plurality of media servers. Further, in some embodiments, the control logic 400 includes the step of performing media server handover from the existing media server to the new media server. In some embodiments, performing media server handover comprises replacing the existing media server with the new media server in the ongoing communication session by transmitting at least a part of media packets from the existing media server to at least one of the new media server or user equipment involved in the ongoing communication session.

Figure 5:
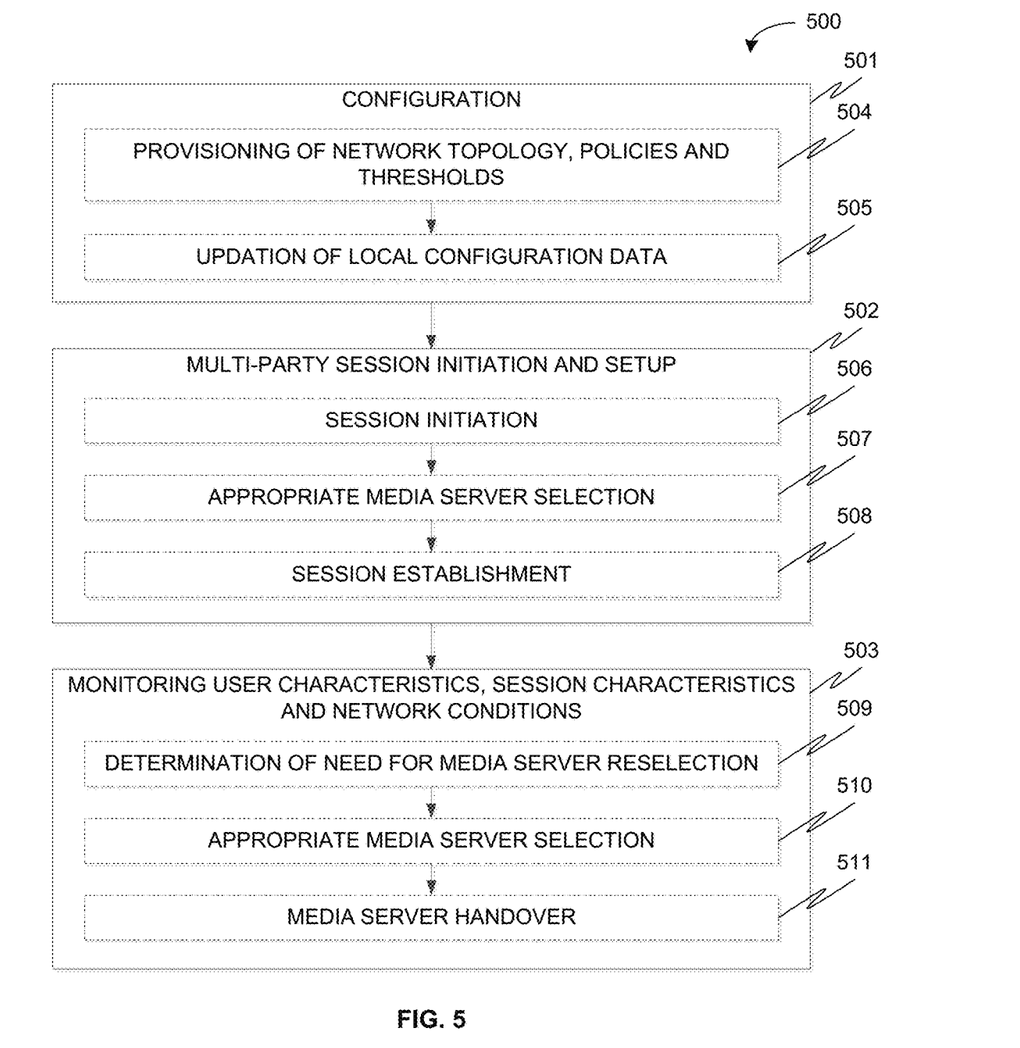
FIG. 5 is a flow diagram of a detailed exemplary process for dynamic selection of media severs in accordance with some embodiments of the present disclosure.

Referring now to FIG. 5, exemplary control logic 500 for dynamic (re)selection of media server in the communication network is depicted in greater detail via a flowchart in accordance with some embodiments of the present disclosure. As illustrated in the flowchart, the control logic 500 includes the steps of configuring the system with network topology, policies and thresholds at step 501, initiating and setting-up a multi-party communication session by selecting an appropriate media server at step 502, and monitoring user characteristics, session characteristics, and network condition for determining a need for (re)selection of media server and for performing media server (re)selection in response to the need at step 503. Each of these steps will be described in greater detail herein below.

In some embodiments, configuring at step 501 further comprises provisioning of network topology, policies, and thresholds at step 504 and updating of local configuration data on various subsystems at step 505. At step 504, the network topology i.e., the location and distances of the various media servers in the operator's network may be provisioned by the operator in the PSS 201 of the softswitch/MGC/S-CSCF 200. Similarly, network, operator, and regulatory policies with reference to routing of calls (e.g., routing of specific calls via the user's home network) and media server selection may be provisioned by the operator in the PSS 201 of the softswitch/MGC/S-CSCF 200. Further, threshold values of network conditions (e.g., usage levels of media server's system resources, network congestion level in the network segment in which the media server is operating), minimum interval between successive selections of media server for the same session, minimum remaining duration of the session for performing a media server (re)selection may be provisioned by the operator in the PSS 201 of the softswitch/MGC/S-CSCF 200. It should be noted that some of these thresholds such as threshold values of network conditions may have 2 or more levels (e.g., Level 1=>60%, Level 2=>85%).

At step 505, the PSS 201 passes the relevant information to the MSSS 203, RSMCS 204 and MOSS 202 in the softswitch/MGC/S-CSCF 200 upon receiving the provisioned inputs. The MSSS 203, RSMCS 204 and MOSS 202 update their local configuration data accordingly. Additionally, the MOSS 202 sends the relevant threshold values to each media server (via the SIGSS 206), instructing them to notify the softswitch/MGC/S-CSCF 200 periodically upon crossing of such thresholds. It should be noted that such information and instructions may be sent using proprietary protocols or using standard protocols such as Session Initiation Protocol (SIP) along with the instruction contents. In some embodiments, the instruction contents may be sent, for e.g., in xml format. Alternatively, in some embodiments, the thresholds for system resource usage level of media server and the congestion level of the network segment in which the media server is present may be directly provisioned in each media server (instead of provisioning them in the softswitch/MGC/S-CSCF 200 and then communicating the threshold values to each media server).

Additionally, in some embodiments, initiating and setting-up a multi-party communication session at step 502 further comprises initiating the communication session at step 506, selecting an appropriate media server at step 507, and establishing the communication session at step 508. At step 506, a user initiates a session that requires a media server, for e.g., a multi-party conference call. The session initiation request reaches the softswitch/MGC/S-CSCF 200. The RSMCS 204 in the softswitch/MGC/S-CSCF 200 performs the usual functions such as determination of session characteristics, authorization, activation of charging function, and so forth. The RSMCS 204 then triggers the MSSS 203 for appropriate media server selection, with relevant inputs such as list of available media servers. As will be appreciated by those skilled in the art, the list of available media servers may be prepared based on the heartbeat/heartbeat response received from the various media servers.

At step 507, the MSSS 203 performs selection of appropriate media server using an algorithm. The algorithm includes creating an initial list of available media servers based on the last received information about the availability of the different media servers in the network, refining the initial list to form a list of selectable media servers for the user session based on network/operator policy, and removing from the refined list those media servers whose system resource usage levels and/or network segment congestion level are above Level 2 threshold limits based on the most recent information received from the MOSS 202. The algorithm further includes computing the overall network path length (ONPL), taking into account all users present in the session as well as the distance to the gateway/node to which the media server has to send the duplicated packets for LI, as follows:

ONPL=Sum of individual path lengths between the media server and each individual user in the session The algorithm further includes subsequently computing the adjusted overall network path length (AONPL) as follows:

$$AONPL=ONPL*MF$$

where MF is the multiplication factor and is determined using a table such as the one provided below, wherein the most recent information received from the MOSS 202 about the media server system resource usage level and network segment congestion level are taken into consideration.

| System Resource Usage Level | Network Segment Congestion Level | Multiplication Factor (MF) |
|---|---|---|
| <Level 1 threshold | <Level 1 threshold | 1.0 |
| <Level 1 threshold | >Level 1 threshold | 1.1 |
| >Level 1 threshold | <Level 1 threshold | 1.1 |
| >Level 1 threshold | >Level 1 threshold | 1.2 |

It should be noted that in case of pre-scheduled conference, the ONPL computation can take into consideration all users who are invited/expected to join the conference. Such information may be obtained, for e.g., from the application server or from the network component that is responsible for setting up the conference call. The algorithm further includes arranging the media servers in ascending order of AONPL and selecting the media server having the least AONPL as the appropriate media server, and the media server with the second-least AONPL as a fallback option. It should be noted that in case the media server resources are managed by a media resource broker (MRB) instead of the softswitch/MGC/S-CSCF, then the media server selection using the algorithm described above will be performed by the MRB. In such case, the MSSS triggers the MRB (via the SIGSS 206) with all the relevant inputs needed for the media server selection. At step 508, the MSSS 203 informs the RSMCS 204 to setup the session after selection of the appropriate media server as described above. The RSMCS 204 sets up the user session involving the media server with the help of SIGSS 206.

Further, in some embodiments, monitoring at step 503 further comprises determining a need for (re)selection of media server at step 509, (re)selecting an appropriate media server in response to the need at step 510, and performing media server handover upon (re)selection at step 511. At step 509, the RSMCS 204 in the softswitch/MGC/S-CSCF monitors the user characteristics for users currently participating in the communication session and the session characteristics once the session is setup successfully. In particular, the RSMCS 204 monitors events such as mobility of one or more users participating in the session and the speed of user movement if greater than pre-provisioned threshold; one or more new users joining the session; one or more existing users leaving the session; activation of lawful interception (LI) for one or more users participating in the session causing routing of media flows via the target user's home network and if the media flows did not flow earlier via the target user's home network; and change in codecs used in the session requiring a different amount (lesser or greater) of media processing resources and if the difference in media processing resources is greater than a pre-provisioned threshold. Upon occurrence of any events, the RSMCS 204 triggers the MSSS 203 to determine a need for media server (re)selection as will be described in greater detail below, if the remaining time before the session is terminated is for example, either >10 minutes or not known. The RSMCS 204 passes all required information for the MSSS 203 to be able to facilitate the determination and subsequently execute step 510 based on positive determination and inputs such as user location, network topology related inputs, list of available media servers, and so forth.

Additionally, at step 509, the MOSS 202 in the softswitch/MGC/S-CSCF 200 monitors the dynamic network conditions based on notifications received from the SIS 303 of the different media servers. The RMS 301 of each media server 300 monitors the system resource usage levels and network segment congestion levels regularly (e.g., once every 30 seconds), and compares these values against the pre-configured thresholds (i.e., thresholds configured at step 505 described above). If the dynamic values of system resource usage levels and network segment congestion levels cross the thresholds, the RMS 301 in the media server 300 notifies the MOSS 202 in the softswitch/S-CSCF 200 (via the SIS 303). The MOSS 202 in the softswitch/MGC/S-CSCF 200 then determines whether the MSSS 203 should be triggered so as to further determine a need for media server (re)selection. Upon receiving a notification from the SIS 303 of a media server 300 that system resource usage levels and/or network segment congestion levels have crossed pre-provisioned thresholds, the MOSS 202 adapts the threshold for determining whether the MSSS 203 should be triggered as follows:

$$\text{Adapted threshold}=\text{Pre-provisioned threshold}*Mu$$

where Mu is determined based on the following table taking into account the dynamic network congestion level and the current Call Attempts Per Second (CAPS) handled by RSMCS.

| Network congestion level | Current CAPS handled by RSMCS | Mu value |
|---|---|---|
| <Level 1 | <60% of dimensioned limit | 1 |
| >Level 1, <Level 2 | <60% of dimensioned limit | 1.1 |
| >Level 1, <Level 2 | >60%, <80% of dimensioned limit | 1.2 |
| >Level 1, <Level 2 | >80% of dimensioned limit | 1.5 |
| >Level 2 | <60% of dimensioned limit | 1.2 |
| >Level 2 | >60%, <80% of dimensioned limit | 1.5 |
| >Level 2 | >80% of dimensioned limit | 2.0 |

It should be noted that the network congestion level is computed by the MOSS 202 based on inputs from different sub-systems in the softswitch/MGC/S-CSCF 200 having an external interface to other nodes in the network, and the congestion information reported from other nodes in the network (including media servers). The MOSS 202 further compares the current value of at least one of the received system usage levels or the network segment congestion level against the adapted threshold computed above. If the current value is greater than the adapted threshold for the particular media server, the MOSS 202 triggers the MSSS 203 to determine a need for media server (re)selection as will be described in greater detail below. It passes all relevant information to the MSSS 203 in the trigger such as media server's system resource usage level, network segment congestion level, and so forth. However, if the current value is not greater than the adapted threshold, the MOSS 202 waits for a pre-configured interval before adapting the threshold for triggering media server selection again. However, while waiting if a notification arrives from the media server, the MOSS 202 executes the step of adapting the threshold for triggering media server selection again.

Further, at step 509, the MSSS in the softswitch/MGC/S-CSCF determines the need for media server (re)selection upon receiving a trigger from the RSMCS 204 or MOSS 202 as described above. If the trigger for determination of media server (re)selection came from RSMCS 204 and most recent media server selection took place less than 'x' minutes ago ('x' being provisioned value) then MSSS 203 sends a rejection response to the RSMCS 204 (i.e., no media server (re)selection shall be done), and stops executing any further steps. However, if the trigger for determination of media server (re)selection came from RSMCS 204 and most recent media server selection took place 'x' minutes ago or earlier, then MSSS 203 executes step 510 for (re)selection of media server. Further if the trigger for determination of media server (re)selection is from MOSS 202 due to crossing of threshold level of a particular media server's system resource usage levels and/or network segment congestion level then MSSS 203 first determines which user sessions are using that particular media server, and prepares a list of user sessions for which a media server (re)selection should be performed. In some embodiments, the list is prepared in decreasing order of the value of (re)selection_coefficient (RC) computed as follows:

$$RC=\text{Alpha}+\text{Beta}+\text{Gamma}$$

where, Alpha=Number of users involved in the session (Alpha)*Scaling Factor,
Scaling Factor=(Number of users involved in the session)/(number of networks in which these users are present),
Beta=3, if the last media server selection for the session took place >15 minutes ago,
=2, if the last media server selection for the session took place >10 minutes but <=15 minutes ago,
=1, if the last media server selection for the session took place >5 minutes but <=10 minutes ago,
=0, if the last media server selection for the session took place >2 minutes but <=5 minutes ago,
=−3, otherwise, and
Gamma=2, if time remaining for the session is >15 minutes,
=1, if time remaining for the session is >5 minutes, and
=0, otherwise, or if time remaining for the session is not known After preparing a list of user sessions based on decreasing value of RC as explained above, the MSSS 203 executes step 510 for (re)selection of media server for each of the first 'N' user sessions,
where, N=Minimum {Number of ongoing user sessions whose RC value is >0, Provisioned value of number of user sessions (M)+(Current value of network segment congestion level or media server system resource usage−Threshold Level 2 value)*Epsilon},
and where, M=provisioned value of number of user sessions for which media server (re)selection should be done to bring down the congestion and/or system resource usage below threshold level,
and where Epsilon=multiplication factor indicating the number of user sessions causing a 1% increase in system resource usage and/or network segment congestion.

At step 510, the appropriate media server is (re)selected in response to the need determined at step 509. The process of (re)selecting appropriate media server is same as that described in step 507 above. At step 511, media server handover is performed upon (re)selection of the appropriate media server at step 510. If the newly selected media server is different from the media server currently included in the session, the MSSS 203 instructs the MSRS 205 to ensure that the media server handover is completed successfully and in a seamless manner. The MSSS 203 provides relevant information such as identity of the current or existing media server (EMS) and the newly selected media server (NSMS) to the MSRS 205. Upon receiving the trigger for media server handover, the MSRS 205 first determines the steps involved in the handover process as described herein. The MSRS 205 determines whether all packets sent to the EMS should be sent successfully to all the users before sending of new packets from the NSMS. This is determined based on session characteristics. For example, in case of a voice call, it may be appropriate to start sending newer packets from the NSMS without ensuring that all older packets from the EMS are sent successfully. If all packets sent to the EMS should be sent successfully to all the users before sending of new packets from the NSMS, the MSRS 205 then determines whether it should be continued to be sent from the EMS, or forwarded to the NSMS and then sent to all the users. This may be determined by taking into consideration the distance between all the users and the NSMS, distance between all the users and the EMS, and the distance between NSMS and EMS. It should be noted that, in some embodiments, a hybrid approach may also be employed, i.e., for some users remaining packets from the EMS will be sent directly, while for other users, the remaining packets from the EMS will be forwarded to the NSMS which then sends those packets to the users.

The MSRS then instructs the RSMCS 204 to appropriately reconfigure the session (i.e., replace the EMS with the NSMS in the session), and also sends relevant instructions (via the SIGSS 206) to the EMS and the NSMS. The instructions may be sent using proprietary protocols or using standard protocols such as SIP, with the instruction contents, sent, for e.g., in xml format. Upon receiving instructions from the SIGSS 206 of the softswitch/MGC/S-CSCF 200 to handover the media processing to a NSMS as described above, along with the NSMS identity, the SIS 303 in the EMS passes the information to the MHSS 304 in the EMS. Based on the instructions received from the softswitch/MGC/S-CSCF, the MHSS 304 in the EMS performs following actions:

If any remaining media packets can be simply dropped without forwarding to the users (e.g., in case of a voice call), the MHSS 304 instructs the MPS 302 to simply drop the remaining packets and send a notification to the softswitch/MGC/S-CSCF 200 (via the SIS 303).

If the remaining media packets have to be sent to the users directly, the MHSS 304 instructs the MPS 302 to send them, and upon completion of sending (and receiving acknowledgement if applicable), send an indication to the softswitch/MGC/S-CSCF 200 and to the NSMS (via the SIS 303).

If the remaining media packets have to be forwarded to the NSMS, the MHSS 304 instructs the MPS 302 to forward them to the MPS 302 of the NSMS, and upon completion of sending (and receiving acknowledgement if applicable), send an indication to the softswitch/MGC/S-CSCF 200 and to the NSMS (via SIS 303).

The MPS 302 in the EMS follows the instructions given by the MHSS 304.

Upon receiving instructions from the SIGSS 206 of the softswitch/MGC/S-CSCF 200 about the handover of the media processing from an EMS as described above, along with the EMS identity, the SIS 303 in the NSMS passes the information to the MHSS 304 in the NSMS. The MHSS 304 in the NSMS performs the following actions based on the instructions received from the softswitch/MGC/S-CSCF 200:

If sending of new media packets should be delayed until completion of sending of all packets by the EMS, the MHSS 304 instructs the MPS 302 to delay the sending of packets until reception of a 'go ahead' trigger from the MHSS 304.

If new media packets can be sent immediately, the MHSS 304 instructs the MPS 302 to start sending the new media packets.

If media packets received from the MPS 302 of the EMS should be forwarded to all users before starting to send the new media packets, the MHSS 304 instructs the MPS 302 to do so, until reception of an explicit 'go ahead' from the MHSS 304.

The MPS 302 in the NSMS follows the instructions given by the MHSS 304. Upon completion of the actions described above and after receiving indication from the EMS that all handover actions in the EMS are complete, the NSMS sends a notification to the softswitch/MGC/S-CSCF 200 (via the SIS 303) to indicate the completion of handover. Upon reception of an indication of completion of handover actions from the EMS and the NSMS (via the SIGSS 206 and the RSMCS 204), the MSRS 205 informs the MSSS 203. It should be noted that, in some embodiments, the MSRS 205 also starts a pre-provisioned timer (typically, say, 1 minute) for completion of media server handover. If the timer expires before receiving a success indication from the EMS and/or NSMS, or if a failure indication is received from the EMS and/or NSMS, the MSRS 205 informs the MSSS 203, RSMCS 204 and MOSS 202 accordingly. Further, after completion of the media server handover as described above, the softswitch/MGC/S-CSCF 200 continues to monitor users, session characteristics and network conditions as described in step 503 for any subsequent (re)selection based upon a determined need.

As will be also appreciated, the above described techniques may take the form of computer or controller implemented processes and apparatuses for practicing those processes. The disclosure can also be embodied in the form of computer program code containing instructions embodied in tangible media, such as floppy diskettes, CD-ROMs, hard drives, or any other computer-readable storage medium, wherein, when the computer program code is loaded into and executed by a computer or controller, the computer becomes an apparatus for practicing the invention. The disclosure may also be embodied in the form of computer program code or signal, for example, whether stored in a storage medium, loaded into and/or executed by a computer or controller, or transmitted over some transmission medium, such as over electrical wiring or cabling, through fiber optics, or via electromagnetic radiation, wherein, when the computer program code is loaded into and executed by a computer, the computer becomes an apparatus for practicing the invention. When implemented on a general-purpose microprocessor, the computer program code segments configure the microprocessor to create specific logic circuits.

Figure 6:
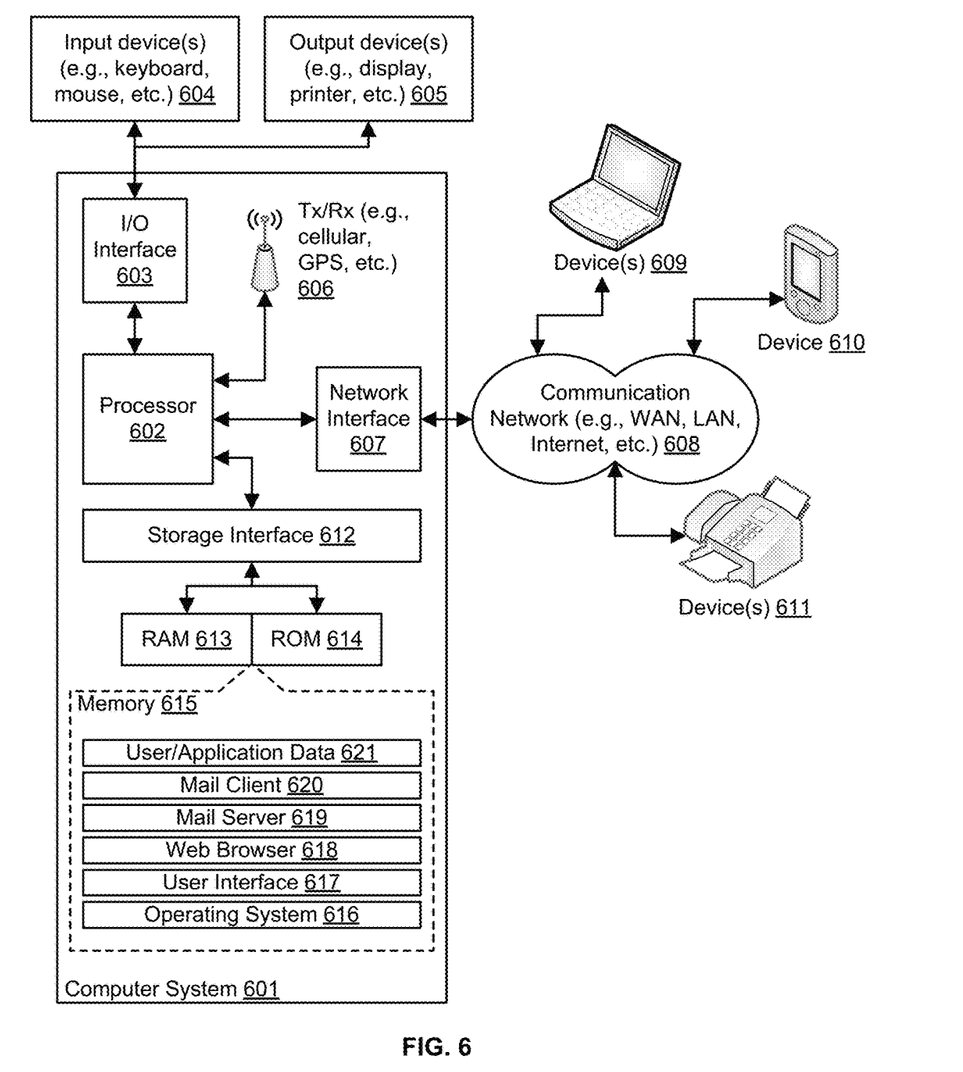
FIG. 6 is a block diagram of an example of a communication management network computing device for implementing embodiments consistent with the present disclosure.

The disclosed methods and systems may be implemented on a conventional or a general-purpose computer system, such as a personal computer (PC) or server computer. Referring now to FIG. 6, a block diagram of an example of a communication management network computing device or computer system 601 for implementing embodiments consistent with the present disclosure is illustrated. Variations of computer system 601 may be used for implementing components of communication network 100, the node 200, and the media server 300 for dynamic selection of media server in the communication network. In this example, the communication management network computing device or computer system 601 may comprise a central processing unit ("CPU" or "processor") 602. Processor 602 may comprise at least one data processor for executing program components for executing user- or system-generated requests. A user may include a person, a person using a device such as such as those included in this disclosure, or such a device itself. The processor may include specialized processing units such as integrated system (bus) controllers, memory management control units, floating point units, graphics processing units, digital signal processing units, etc. The processor may include a microprocessor, such as AMD Athlon, Duron or Opteron, ARM's application, embedded or secure processors, IBM PowerPC, Intel's Core, Itanium, Xeon, Celeron or other line of processors, etc. The processor 602 may be implemented using mainframe, distributed processor, multi-core, parallel, grid, or other architectures. Some embodiments may utilize embedded technologies like application-specific integrated circuits (ASICs), digital signal processors (DSPs), Field Programmable Gate Arrays (FPGAs), etc.

Processor 602 may be disposed in communication with one or more input/output (I/O) devices via I/O interface 603. The I/O interface 603 may employ communication protocols/methods such as, without limitation, audio, analog, digital, monoaural, RCA, stereo, IEEE-1394, serial bus, universal serial bus (USB), infrared, PS/2, BNC, coaxial, component, composite, digital visual interface (DVI), high-definition multimedia interface (HDMI), RF antennas, S-Video, VGA, IEEE 802.n/b/g/n/x, Bluetooth, cellular (e.g., code-division multiple access (CDMA), high-speed packet access (HSPA+), global system for mobile communications (GSM), long-term evolution (LTE), WiMax, or the like), etc.

Using the I/O interface 603, the computer system 601 may communicate with one or more I/O devices. For example, the input device 604 may be an antenna, keyboard, mouse, joystick, (infrared) remote control, camera, card reader, fax machine, dongle, biometric reader, microphone, touch screen, touchpad, trackball, sensor (e.g., accelerometer, light sensor, GPS, gyroscope, proximity sensor, or the like), stylus, scanner, storage device, transceiver, video device/source, visors, etc. Output device 605 may be a printer, fax machine, video display (e.g., cathode ray tube (CRT), liquid crystal display (LCD), light-emitting diode (LED), plasma, or the like), audio speaker, etc. In some embodiments, a transceiver 606 may be disposed in connection with the processor 602. The transceiver may facilitate various types of wireless transmission or reception. For example, the transceiver may include an antenna operatively connected to a transceiver chip (e.g., Texas Instruments WiLink WL1283, Broadcom BCM4750IUB8, Infineon Technologies X-Gold 618-PMB9800, or the like), providing IEEE 802.11a/b/g/n, Bluetooth, FM, global positioning system (GPS), 2G/3G HSDPA/HSUPA communications, etc.

In some embodiments, the processor 602 may be disposed in communication with a communication network 608 via a network interface 607. The network interface 607 may communicate with the communication network 608. The network interface may employ connection protocols including, without limitation, direct connect, Ethernet (e.g., twisted pair 10/100/1000 Base T), transmission control protocol/internet protocol (TCP/IP), token ring, IEEE 802.11a/b/g/n/x, etc. The communication network 608 may include, without limitation, a direct interconnection, local area network (LAN), wide area network (WAN), wireless network (e.g., using Wireless Application Protocol), the Internet, etc. Using the network interface 607 and the communication network 608, the computer system 601 may communicate with devices 609, 610, and 611. These devices may include, without limitation, personal computer(s), server(s), fax machines, printers, scanners, various mobile devices such as cellular telephones, smartphones (e.g., Apple iPhone, Blackberry, Android-based phones, etc.), tablet computers, eBook readers (Amazon Kindle, Nook, etc.), laptop computers, notebooks, gaming consoles (Microsoft Xbox, Nintendo DS, Sony PlayStation, etc.), or the like. In some embodiments, the computer system 601 may itself embody one or more of these devices.

In some embodiments, the processor 602 may be disposed in communication with one or more memory devices (e.g., RAM 413, ROM 414, etc.) via a storage interface 612. The storage interface may connect to memory devices including, without limitation, memory drives, removable disc drives, etc., employing connection protocols such as serial advanced technology attachment (SATA), integrated drive electronics (IDE), IEEE-1394, universal serial bus (USB), fiber channel, small computer systems interface (SCSI), etc. The memory drives may further include a drum, magnetic disc drive, magneto-optical drive, optical drive, redundant array of independent discs (RAID), solid-state memory devices, solid-state drives, etc.

The memory devices may store a collection of program or database components, including, without limitation, an operating system 616, user interface application 617, web browser 618, mail server 619, mail client 620, user/application data 621 (e.g., any data variables or data records discussed in this disclosure), etc. The operating system 616 may facilitate resource management and operation of the computer system 601. Examples of operating systems include, without limitation, Apple Macintosh OS X, Unix, Unix-like system distributions (e.g., Berkeley Software Distribution (BSD), FreeBSD, NetBSD, OpenBSD, etc.), Linux distributions (e.g., Red Hat, Ubuntu, Kubuntu, etc.), IBM OS/2, Microsoft Windows (XP, Vista/7/8, etc.), Apple iOS, Google Android, Blackberry OS, or the like. User interface 617 may facilitate display, execution, interaction, manipulation, or operation of program components through textual or graphical facilities. For example, user interfaces may provide computer interaction interface elements on a display system operatively connected to the computer system 601, such as cursors, icons, check boxes, menus, scrollers, windows, widgets, etc. Graphical user interfaces (GUIs) may be employed, including, without limitation, Apple Macintosh operating systems' Aqua, IBM OS/2, Microsoft Windows (e.g., Aero, Metro, etc.), Unix X-Windows, web interface libraries (e.g., ActiveX, Java, Javascript, AJAX, HTML, Adobe Flash, etc.), or the like.

In some embodiments, the computer system 601 may implement a web browser 618 stored program component. The web browser may be a hypertext viewing application, such as Microsoft Internet Explorer, Google Chrome, Mozilla Firefox, Apple Safari, etc. Secure web browsing may be provided using HTTPS (secure hypertext transport protocol), secure sockets layer (SSL), Transport Layer Security (TLS), etc. Web browsers may utilize facilities such as AJAX, DHTML, Adobe Flash, JavaScript, Java, application programming interfaces (APIs), etc. In some embodiments, the computer system 601 may implement a mail server 619 stored program component. The mail server may be an Internet mail server such as Microsoft Exchange, or the like. The mail server may utilize facilities such as ASP, ActiveX, ANSI C++/C#, Microsoft .NET, CGI scripts, Java, JavaScript, PERL, PHP, Python, WebObjects, etc. The mail server may utilize communication protocols such as internet message access protocol (IMAP), messaging application programming interface (MAPI), Microsoft Exchange, post office protocol (POP), simple mail transfer protocol (SMTP), or the like. In some embodiments, the computer system 601 may implement a mail client 620 stored program component. The mail client may be a mail viewing application, such as Apple Mail, Microsoft Entourage, Microsoft Outlook, Mozilla Thunderbird, etc.

In some embodiments, computer system 601 may store user/application data 621, such as the data, variables, records, etc. (e.g., user characteristics, session characteristics, network conditions, provisioned inputs and thresholds, configuration data, and so forth) as described in this disclosure. Such databases may be implemented as fault-tolerant, relational, scalable, secure databases such as Oracle or Sybase. Alternatively, such databases may be implemented using standardized data structures, such as an array, hash, linked list, struct, structured text file (e.g., XML), table, or as object-oriented databases (e.g., using ObjectStore, Poet, Zope, etc.). Such databases may be consolidated or distributed, sometimes among the various computer systems discussed above in this disclosure. It is to be understood that the structure and operation of the any computer or database component may be combined, consolidated, or distributed in any working combination.

As will be appreciated by those skilled in the art, the techniques described in the various embodiments discussed above provide for dynamic and optimized selection of media server for multi-party communication session under dynamic network conditions, user characteristics, and session characteristics. This is achieved by triggering (re) selection of appropriate media server by taking into consideration current user and session characteristics, user mobility, network conditions, load on network nodes and servers (e.g., various available media servers). Further, the techniques described in the various embodiments discussed above provides for a seamless handover of the media server after determining that a media server re-selection should be done, and re-selecting an optimal media server. This is achieved by taking into account the session characteristics, distances between the existing media server, newly selected media server and the users participating in the session.

The specification has described system and method for dynamic selection of media server in a communication network. The illustrated steps are set out to explain the exemplary embodiments shown, and it should be anticipated that ongoing technological development will change the manner in which particular functions are performed. These examples are presented herein for purposes of illustration, and not limitation. Further, the boundaries of the functional building blocks have been arbitrarily defined herein for the convenience of the description. Alternative boundaries can be defined so long as the specified functions and relationships thereof are appropriately performed. Alternatives (including equivalents, extensions, variations, deviations, etc., of those described herein) will be apparent to persons skilled in the relevant art(s) based on the teachings contained herein. Such alternatives fall within the scope and spirit of the disclosed embodiments.

Furthermore, one or more computer-readable storage media may be utilized in implementing embodiments consistent with the present disclosure. A computer-readable storage medium refers to any type of physical memory on which information or data readable by a processor may be stored. Thus, a computer-readable storage medium may store instructions for execution by one or more processors, including instructions for causing the processor(s) to perform steps or stages consistent with the embodiments described herein. The term "computer-readable medium" should be understood to include tangible items and exclude carrier waves and transient signals, i.e., be non-transitory. Examples include random access memory (RAM), read-only memory (ROM), volatile memory, nonvolatile memory, hard drives, CD ROMs, DVDs, flash drives, disks, and any other known physical storage media.

It is intended that the disclosure and examples be considered as exemplary only, with a true scope and spirit of disclosed embodiments being indicated by the following claims.

What is claimed is:

1. A method for selecting a new media server to optimize a communication network, the method comprising:
monitoring, via a processor, at least one user characteristic, at least one session characteristic, and at least one network condition during an ongoing communication session involving an existing media server;
determining, via the processor, a need for selection of a new media server during the ongoing communication session in order to optimize the communication network, based on the at least one user characteristic, the at least one session characteristic, and the at least one network condition;
dynamically selecting, via the processor, the new media server in response to the determined need, wherein the dynamically selecting the new media server comprises:
determining, via the processor, a plurality of overall network path lengths between each of a plurality of selectable media servers and a plurality of user equipment involved in the ongoing communication session;
adjusting, via the processor, each of the plurality of overall network path lengths based on at least one of a resource usage level of the corresponding media server or a network segment congestion level in which the corresponding media server is located; and
selecting, via the processor, an optimal media server from the plurality of selectable media servers based on adjusted overall network path lengths for the plurality of selectable media servers; and
identifying, via the processor, the plurality of selectable media servers based on at least one of a plurality of policies related to each of the one or more ongoing communication sessions and to the selection of each of a plurality of media servers, the resource usage level of each of the plurality of media servers, or the network segment congestion level in which the media server is located for each of the plurality of media servers.

2. The method of claim 1, further comprising provisioning, via the processor:
a network topology;
a plurality of policies related to the ongoing communication sessions and to the selection of the new media server; and
a threshold value for the network condition triggering the selection of the new media server.

3. The method of claim 2, further comprising configuring, via the processor, one or more components of the communication network based on the provisioning.

4. The method of claim 1, wherein the determining the need further comprises comparing, via the processor, the at least one user characteristic, the at least one session characteristic, or the at least one network condition against corresponding pre-configured criterion or threshold.

5. The method of claim 1, further comprising performing, via the processor, media server handover from the existing media server to the new media server.

6. The method of claim 5, wherein the performing media server handover further comprises replacing, via the processor, the existing media server with the new media server in the ongoing communication session by transmitting at least a part of media packets from the existing media server to at least one of the new media server or a user equipment involved in the ongoing communication session.

7. The method of claim 1, wherein the user characteristic comprises at least one of an identification of a user participating in the ongoing communication session, a policy with respect to the user, a location of the user, a mobility of the user, a speed of movement of the user, or a past behavior of the user.

8. The method of claim 1, wherein the session characteristic comprises a type of the session, a codec employed in the session, a policy with respect to the session, a duration elapsed since a previous selection of a media server for the session, a minimum remaining duration of the session, an addition of a new user to the session, an exit of a user from the session, or a number of users participating in the session.

9. The method of claim 1, wherein the network condition comprises at least one of a load on each of the plurality of media servers, a policy with respect to selection of the media server, or congestion in the network segment in which each of the plurality of media servers is located.

10. A communication management network computing device:
   at least one processor; and
   a memory coupled to the processor which is configured to be capable of executing programmed instructions comprising and stored in the memory to:
      monitor at least one user characteristic, at least one session characteristic, and at least one network condition during an ongoing communication session involving an existing media server;
      determine a need for selection of a new media server during the ongoing communication session in order to optimize the communication network, based on the at least one user characteristic, the at least one session characteristic, and the at least one network condition;
      dynamically select the new media server in response to the determined need, wherein the dynamically selecting the new media server comprises:
         determining a plurality of overall network path lengths between each of a plurality of selectable media servers and a plurality of user equipment involved in the ongoing communication session;
         adjusting each of the plurality of overall network path lengths based on at least one of a resource usage level of the corresponding media server or a network segment congestion level in which the corresponding media server is located; and
         selecting an optimal media server from the plurality of selectable media servers based on adjusted overall network path lengths for the plurality of selectable media servers; and
      identify the plurality of selectable media servers based on at least one of a plurality of policies related to each of the one or more ongoing communication sessions and to the selection of each of a plurality of media servers, the resource usage level of each of the plurality of media servers, or the network segment congestion level in which the media server is located for each of the plurality of media servers.

11. The device of claim 10, wherein the processor coupled to the memory is further configured to be capable of executing at least one additional programmed instruction further comprising and stored in the memory to:
   provision a network topology, a plurality of policies related to the ongoing communication sessions and to the selection of the new media server, and a threshold value for the network condition triggering the selection of the new media server; and
   configure one or more components of the communication network based on the provisioning.

12. The device of claim 10, wherein the processor coupled to the memory that is configured to determine the need for selection of the new media server is further configured to be capable of executing at least one additional programmed instruction further comprising and stored in the memory to compare the at least one user characteristic, the at least one session characteristic, or the at least one network condition against corresponding pre-configured criterion or threshold.

13. The device of claim 10, wherein the processor coupled to the memory that is configured to dynamically select is further configured to be capable of executing at least one additional programmed instruction further comprising and stored in the memory to:
   perform media server handover from the existing media server to the new media server.

14. The device of claim 13, wherein the processor coupled to the memory that is configured to perform media server handover is further configured to be capable of executing at least one additional programmed instruction further comprising and stored in the memory to:
   replace the existing media server with the new media server in the ongoing communication session by transmitting at least a part of media packets from the existing media server to at least one of the new media server and a user equipment involved in the ongoing communication session.

15. A non-transitory computer readable medium having stored thereon instructions for selecting a new media server to optimize a communication network comprising executable code which when executed by a processor, causes the processor to perform steps to:
   monitor at least one user characteristic, at least one session characteristic, and at least one network condition during an ongoing communication session involving an existing media server;
   determine a need for selection of a new media server during the ongoing communication session in order to optimize the communication network, based on the at least one user characteristic, the at least one session characteristic, and the at least one network condition;
   dynamically select the new media server response to the determined need, wherein the dynamically selecting the new media server comprises;
      determining a plurality of overall network path lengths between each of a plurality of selectable media servers and a plurality of user equipment involved in the ongoing communication session;
      adjusting each of the plurality of overall network path lengths based on at least one of a resource usage level of the corresponding media server or a network segment congestion level in which the corresponding media server is located; and selecting an optimal media server from the plurality of selectable media servers based on adjusted overall network path lengths for the plurality of selectable media servers; and identifying the plurality of selectable media servers based on at least one of a plurality of policies related to each of the one or more ongoing communication sessions and to the selection of each of a plurality of media servers, the resource usage level of each of the plurality of media servers, or the network segment congestion level in which the media server is located for each of the plurality of media servers.

16. The non-transitory computer readable medium of claim 15, wherein the executable code when executed by the processor causes the processor to perform one or more additional steps to:

provision a network topology, a plurality of policies related to the ongoing communication sessions and to the selection of the new media server; and a threshold value for the network condition triggering the selection of the new media server; and configure one or more components of the communication network based on the provisioning.

17. The non-transitory computer readable medium of claim 15, wherein the determining the need further comprises comparing the at least one user characteristic, the at least one session characteristic, or the at least one network condition against corresponding pre-configured criterion or threshold.

18. The non-transitory computer readable medium of claim 15, wherein the executable code when executed by the processor causes the processor to perform one or more additional steps to:

perform media server handover from the existing media server to the new media server, wherein the performing media server handover further comprises replacing the existing media server with the new media server in the ongoing communication session by transmitting at least a part of media packets from the existing media server to at least one of the new media server or a user equipment involved in the ongoing communication session.

19. The non-transitory computer readable medium of claim 15, wherein the user characteristic comprises at least one of an identification of a user participating in the ongoing communication session, a policy with respect to the user, a location of the user, a mobility of the user, a speed of movement of the user, or a past behavior of the user.

20. The non-transitory computer readable medium of claim 15, wherein the session characteristic comprises a type of the session, a codec employed in the session, a policy with respect to the session, a duration elapsed since a previous selection of a media server for the session, a minimum remaining duration of the session, an addition of a new user to the session, an exit of a user from the session, or a number of users participating in the session.

* * * * *